United States Patent
Schlenke

(10) Patent No.: US 9,488,368 B2
(45) Date of Patent: Nov. 8, 2016

(54) DEFROSTING A SENSOR IN A VEHICLE SYSTEM

(71) Applicant: SSI Technologies, Inc.

(72) Inventor: David T. Schlenke, Janesville, WI (US)

(73) Assignee: SSI Technologies, Inc., Janesville, WI (US)

( * ) Notice: Subject to any disclaimer, the term of this patent is extended or adjusted under 35 U.S.C. 154(b) by 287 days.

(21) Appl. No.: 13/956,849

(22) Filed: Aug. 1, 2013

(65) Prior Publication Data

US 2015/0033700 A1 Feb. 5, 2015

(51) Int. Cl.
| | |
|---|---|
| F01N 3/00 | (2006.01) |
| F01N 3/10 | (2006.01) |
| F22B 1/18 | (2006.01) |
| F01N 3/20 | (2006.01) |

(52) U.S. Cl.
CPC ........... *F22B 1/1807* (2013.01); *F01N 3/2066* (2013.01); *F01N 2610/02* (2013.01); *F01N 2610/10* (2013.01); *F01N 2610/1406* (2013.01); *F01N 2610/148* (2013.01); *F01N 2610/1473* (2013.01); *F01N 2900/1811* (2013.01); *F01N 2900/1814* (2013.01); *F01N 2900/1818* (2013.01); *Y02T 10/24* (2013.01)

(58) Field of Classification Search
CPC ........... F01N 2610/02; F01N 2610/10; F01N 2610/1406; F01N 2610/1473; F01N 2610/148; F01N 2900/1811; F01N 2900/1814; F01N 2900/1818; F01N 3/2066; F22B 1/1807
USPC ............................ 60/286, 295, 298, 301, 303
See application file for complete search history.

(56) References Cited

U.S. PATENT DOCUMENTS

| | | | | |
|---|---|---|---|---|
| 4,865,005 | A | * | 9/1989 | Griffith .......................... 123/546 |
| 6,063,350 | A | * | 5/2000 | Tarabulski et al. ......... 423/239.1 |
| 6,266,955 | B1 | * | 7/2001 | Liang et al. ..................... 60/274 |
| 7,647,767 | B2 | * | 1/2010 | Osaku et al. .................... 60/286 |
| D619,688 | S | | 7/2010 | Gismervik |
| D621,015 | S | | 8/2010 | Gismervik |
| D622,833 | S | | 8/2010 | Gismervik |
| D625,396 | S | | 10/2010 | Gismervik |
| 8,069,649 | B2 | * | 12/2011 | Matsunaga ..................... 60/277 |
| 2010/0050603 | A1 | | 3/2010 | Seino et al. |
| 2010/0154907 | A1 | | 6/2010 | Lecea et al. |
| 2011/0030349 | A1 | | 2/2011 | Makartchouk et al. |

FOREIGN PATENT DOCUMENTS

| | | |
|---|---|---|
| CN | 202284490 | 6/2012 |
| CN | 102852602 | 1/2013 |

(Continued)

*Primary Examiner* — Thomas Denion
*Assistant Examiner* — Diem Tran
(74) *Attorney, Agent, or Firm* — Michael Best & Friedrich LLP

(57) ABSTRACT

Systems and methods for defrosting sensing components in fluid sensing system. In one embodiment, the invention provides a defrosting system that includes a sensing system. The sensing system includes a sensor operable to sense a characteristic of the fluid in a tank. The defrosting system includes a fluid pickup line spaced apart from the sensor, and a fluid return line. The fluid return line includes an output. The output is positioned to direct fluid onto the sensing system. In one embodiment, the defrosting system further comprises a pipe configured to provide the fluid to a system external to the tank. The fluid is heated by heat generated by the external system and directed onto the sensing system at least partially defrosts fluid contained within the sensing system.

19 Claims, 6 Drawing Sheets

(56) References Cited

FOREIGN PATENT DOCUMENTS

| DE | 102011103644 | 12/2012 |
| IN | 588/CHE/2010 | 9/2011 |
| WO | 2006090182 | 8/2006 |
| WO | 2011078692 | 6/2011 |
| WO | 2012081773 | 6/2012 |

* cited by examiner

DEFROSTING A SENSOR IN A VEHICLE SYSTEM

BACKGROUND

The present invention relates to systems for heating a sensor immersed or surrounded by a frozen liquid and, more particularly, to a system for heating a sensor used to sense a liquid to be used with a selective catalytic reluctant diesel emission system.

Selective Catalytic Reduction (SCR) is a method of converting diesel oxides of nitrogen (NOx) emissions, by catalytic reaction, into diatomic benign nitrogen gas ($N_2$) and water ($H_2O$). In clean diesel engines, an SCR system delivers near-zero emissions of NOx.

Diesel Exhaust Fluid (DEF) is used to reduce nitrous oxide (NOx) gases in the exhaust of diesel engines. DEF is a mixture of purified water and urea. In a typical SCR system, DEF is stored in a tank of a vehicle and is injected via one or more injectors into the exhaust at a ratio of about 1:50 to the diesel fuel being burned. The injected urea (in the form of a mist) mixes with the exhaust and breaks down NOx in the exhaust into nitrogen, water, and carbon dioxide.

SUMMARY

To ensure proper operation of an SCR system it is important to sense the quality and quantity of the DEF fluid. When contaminants such as diesel fuel, water, and ethylene gycol, mix with the DEF, the ability of the DEF to reduce the NOx in the exhaust is diminished. Contaminated DEF may also cause damage to the NOx reluctant system. It is also important that a sufficient amount of DEF be available for use in the SCR system. In or near the tank, one or more sensors are used to sense certain characteristics of the DEF. The sensors may include, but are not limited to: a level sensor for determining a quantity of DEF in the tank; a concentration sensor for determine the quality of DEF in the tank; and a temperature sensor.

The DEF is circulated from the tank to the injectors via a pump. Any unused DEF is returned to the tank. DEF freezes at approximately −11° Celsius. If the ambient temperature drops below the freezing point of DEF for a sufficient period of time, the liquid DEF in the tank, the circulation plumbing, and any DEF in or around sensors used to sense or monitor the DEF quality will freeze. When the DEF freezes, the ability of the SCR system is operated is either diminished or eliminated.

One method of dealing with the problems associated with freezing of DEF is to locate a heat source near a DEF pickup, which is usually at the bottom the DEF tank. With such a heat source it is possible to thaw DEF near the pickup. However, other portions of the SCR, particularly DEF sensors, may remain frozen or encased in frozen DEF for an extended period of time until convection of heat from the bottom of the tank thaws the DEF in other portions of the SCR system.

To overcome some of these problems, one embodiment of the invention provides a system for heating and sensing a fluid in a tank. The system includes a a sensor operable or configured to sense a characteristic of the fluid. The system for heating and sensing fluid in a tank also includes a fluid pickup line configured to take in fluid from the tank. In certain embodiments, the fluid pickup line is space apart from the sensor. A fluid return line configured to return the fluid to the tank. The fluid return line includes an output. The output is positioned to direct fluid onto the sensor. The system may also include a pipe configured to provide the fluid to a system external to the tank, such as an exhaust system. The fluid is heated by heat generated by the external system, and the heated fluid is directed onto the sensor to at least partially defrost fluid contained within and surrounding the sensor. The system may also include a controller configured to receive the sensed characteristic of the fluid, analyze the sensed characteristic of the fluid, and output the analyzed characteristic of the fluid.

In another embodiment the invention provides a method for defrosting components in a sensing system and sensing a fluid in a tank of a vehicle system, such as an SCR system. The tank includes a sensing system having a sensor and a controller, a fluid pickup line, and a fluid return line. The method includes taking in fluid from the tank via the fluid pickup line and transporting the fluid outside the tank; returning the fluid to the tank via the fluid return line, and directing the returned fluid onto the sensing system. The method may also include sensing a characteristic of the fluid; analyzing the sensed characteristic of the fluid; and outputting the analyzed characteristic of the fluid.

Other aspects of the invention will become apparent by consideration of the detailed description and accompanying drawings.

DETAILED DESCRIPTION

Before any embodiments of the invention are explained in detail, it is to be understood that the invention is not limited in its application to DEF or UREA based fluids, the details of construction, and the arrangement of components set forth in the following description or illustrated in the following drawings. The invention is capable of other embodiments and of being practiced or of being carried out in various ways.

Although the invention described herein can be applied to, or used in conjunction with a variety of fluids, embodiments of the invention described herein are described with respect to diesel exhaust fluid (DEF) for use in a selective catalytic reduction system.

Figure 1:
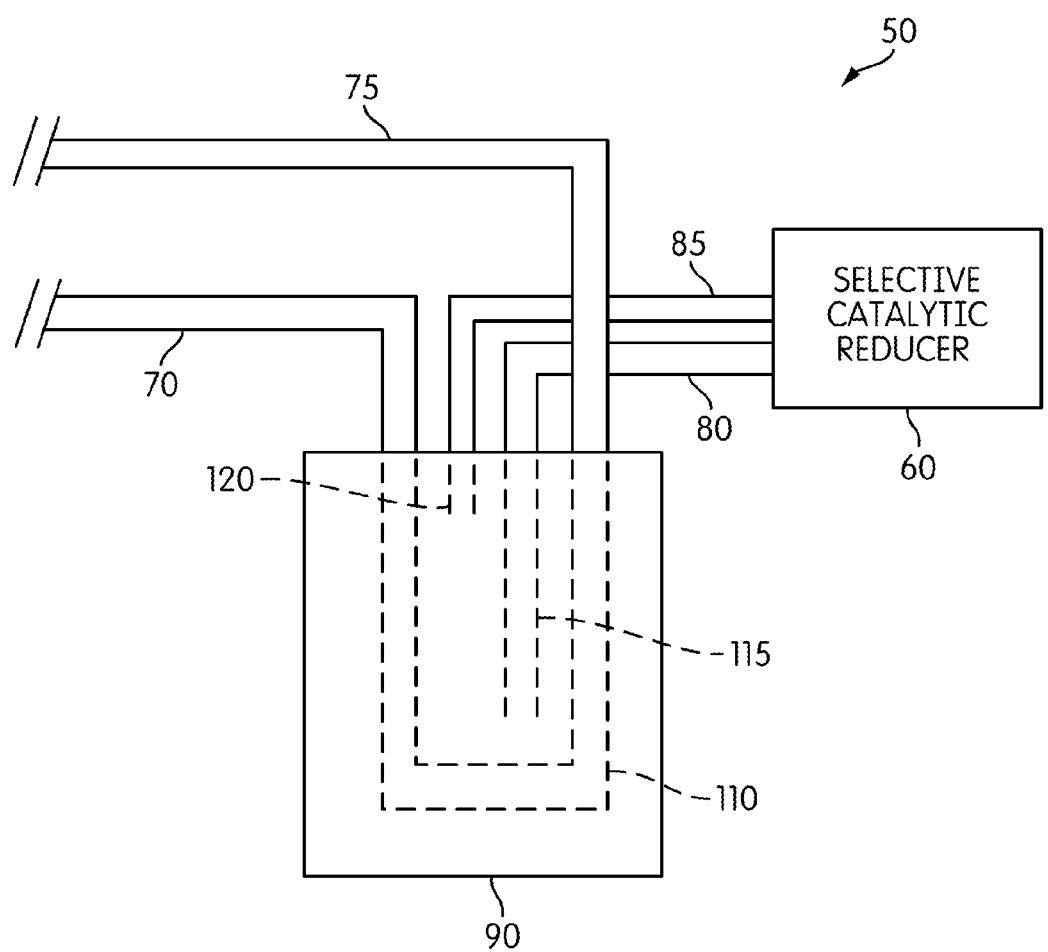
FIG. 1 is a block diagram illustrating a system for selective catalytic reduction.

FIG. 1 illustrates a system 50 for converting diesel oxides of nitrogen (NOx) emissions, by catalytic reaction, into diatomic benign nitrogen gas ($N_2$) and water ($H_2O$). In some embodiments, the system 50 includes a selective catalytic reducer (SCR) 60, a coolant input pipe 70, a coolant output pipe 75, a DEF pickup pipe 80, a DEF return pipe 85, and a tank or vessel 90. In operation, the DEF is delivered to the SCR 60 from the tank 90 via the DEF pickup pipe 80. The SCR 60 uses the DEF to convert the NOx emissions into nitrogen gas and water. Unused DEF is returned to the tank 90 via the DEF return pipe 85. In the illustrated embodiment, the coolant input pipe 70 and coolant output pipe 75 run through the tank 90 in order to heat the DEF contained within the tank 90.

Figure 2:
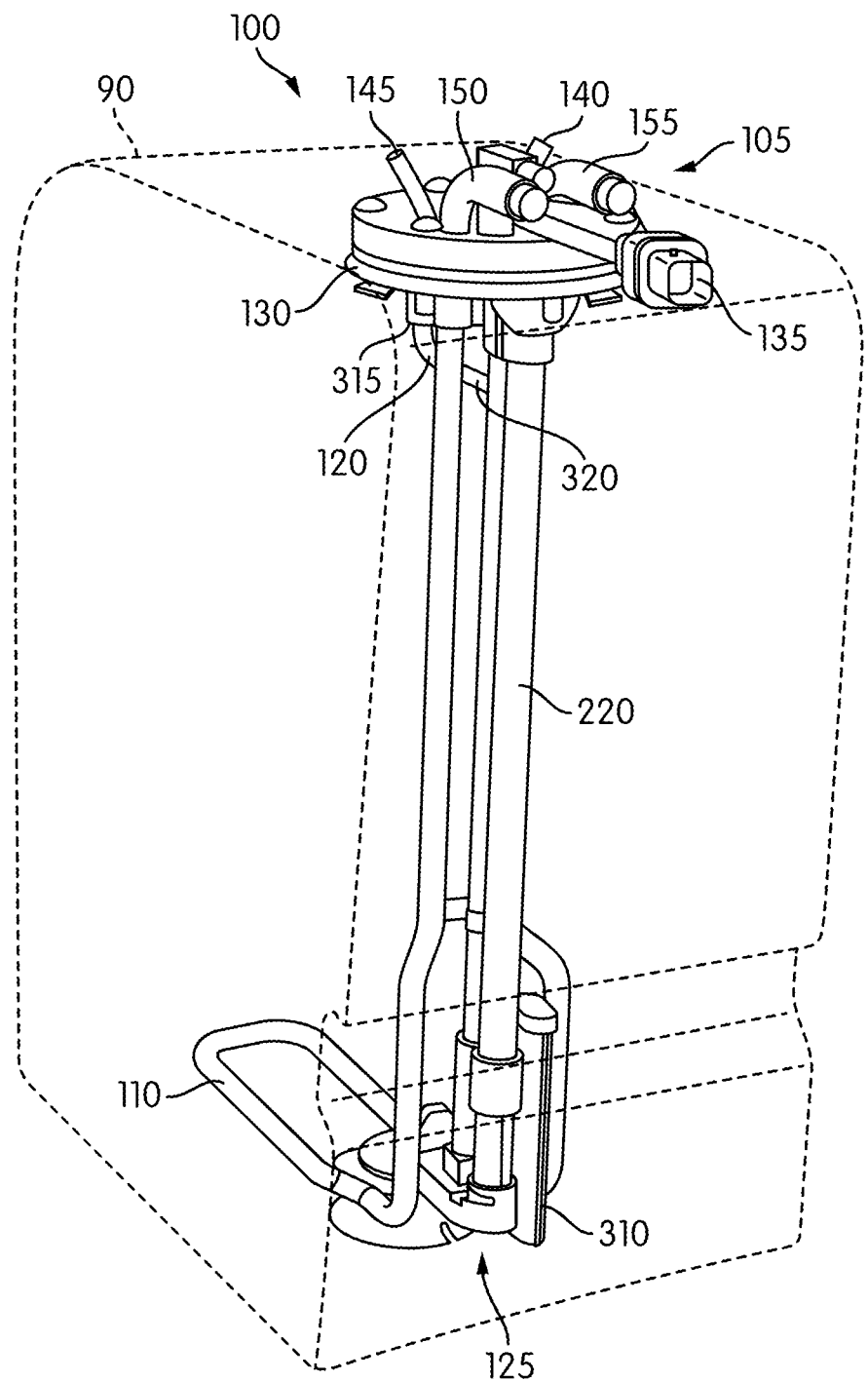
FIG. 2 is a perspective view of an apparatus for holding and sensing a fluid for use in the system of FIG. 1, according to one embodiment of the invention.
Figure 3:
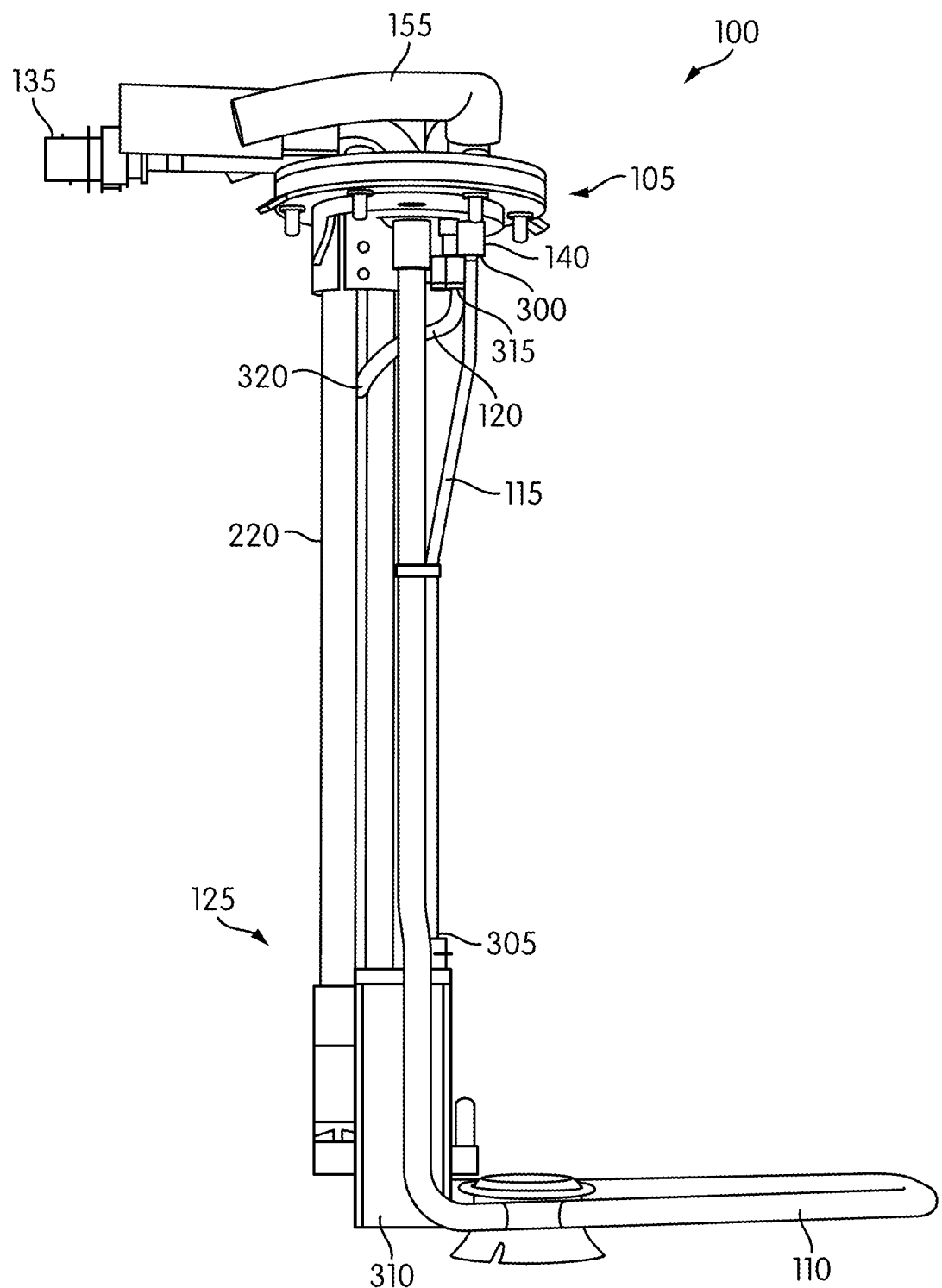
FIG. 3 is a side view of the apparatus of FIG. 2.

FIGS. 2 and 3 illustrate an apparatus 100 for sensing and heating a fluid contained within the tank 90. In some embodiments, the fluid is diesel exhaust fluid (DEF) (i.e., a urea solution, liquid urea, urea, or Adblue™) for use in the system 50.

The apparatus 100 includes a header 105, a heater loop 110, a pickup line 115, a return line 120, and a sensor system 125. The header 105 encloses the fluid inside the tank 90. In some embodiments, a gasket 130 seals the header 105 to the tank 90. The header 105 includes a plurality of fittings and an electrical connector 135. In some embodiments, the plurality of fittings include a pickup fitting 140, a return fitting 145, a coolant input fitting 150, and a coolant output fitting 155. The plurality of fittings provides various paths for fluid to be transported or directed into, out of, and through the tank 90. The electrical connector 135 provides an electrical connection from the sensor system 125 to an external computer system (e.g., a vehicle's data bus).

Figure 4:
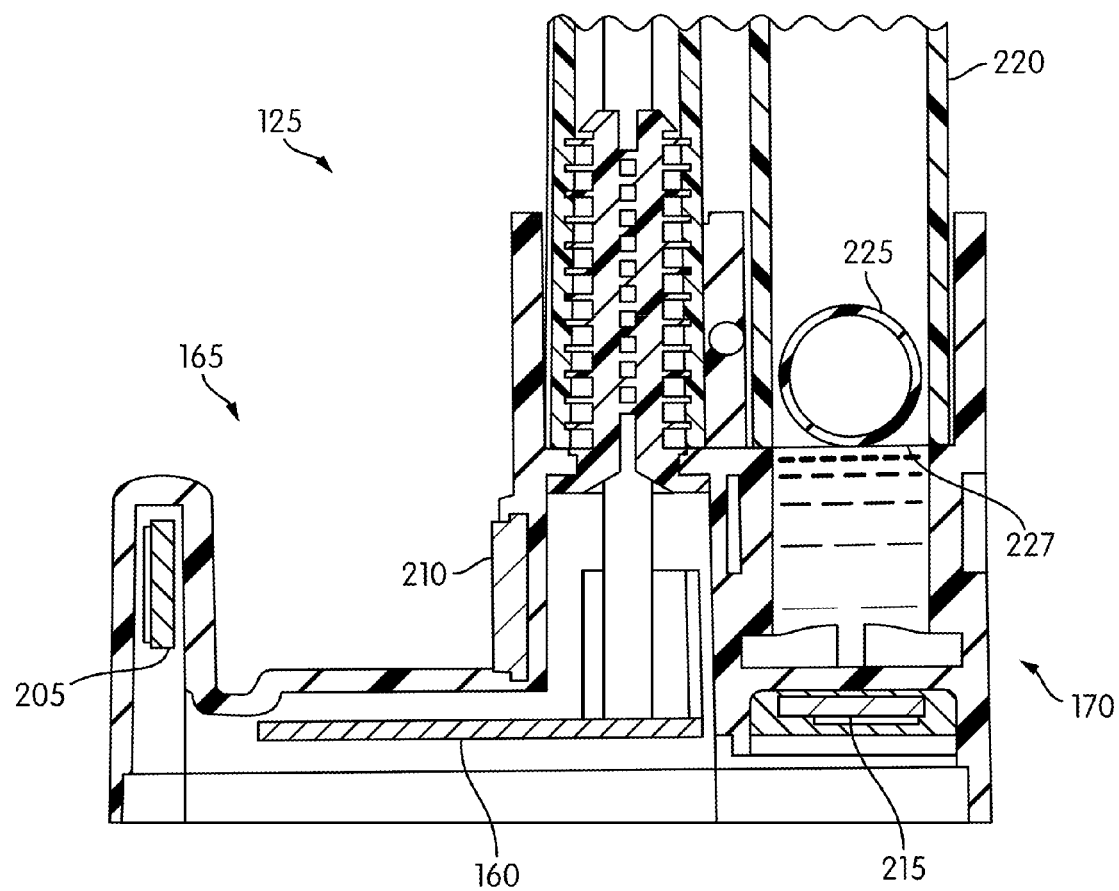
FIG. 4 is a side view of a sensing system for use in the apparatus of FIGS. 2 and 3.

FIG. 4 illustrates the sensor system 125. The sensor system 125 includes a printed circuit board (PCB) 160 and a plurality of sensors. In the illustrated embodiment, the plurality of sensors includes a concentration sensor 165, a level sensor 170, and a temperature sensor 175. In other embodiments, the sensor system 125 may include more or less sensors than shown in the illustrated embodiment. Each of the plurality of sensors is electrically coupled to the PCB 160. The PCB 160 includes a control system 200 (FIG. 5), which, among other things, provides power to the plurality of sensors, analyzes data from the plurality of sensors; and outputs the analyzed data to other components such as an external computer.

The concentration sensor 165 determines a concentration, and thus a quality, of the fluid within the tank 90. The concentration sensor 165 includes a concentration piezoelectric ultrasonic transducer (PZT) 205 and a concentration reflector 210. The concentration PZT 205 acts as both a transmitter and receiver. In operation, the concentration PZT 205 generates an acoustic wave signal, which propagates through the fluid toward the concentration reflector 210. The acoustic wave signal reflects off of the concentration reflector 210 and travels back toward the concentration PZT 205. The concentration time-of-flight (ToF) of the acoustic wave signal is output to the control system 200. Although shown in the illustrated embodiment, other embodiments of the apparatus 100 do not include a concentration sensor 165.

The level sensor 170 determines a level, and thus a quantity, of the fluid within the tank 90. In the illustrated embodiment, the level sensor 170 includes a level PZT 215 and a level focus tube 220. The level PZT 215 acts as both a transmitter and receiver. Some embodiments also include a float. In the particular embodiment illustrated, the level sensor 170 includes a float 225 located within the level focus tube 220. Although illustrated as a sphere in FIG. 4, the float 225 may be another shape, including but not limited to, a cylinder. The float 225 floats on the surface of the DEF solution contained within the tank 90. The level PZT 215 generates an acoustic wave signal, which propagates through the fluid contained within the level focus tube 220. The acoustic wave signal propagates toward the float 225. The acoustic wave signal reflects off of the float 225, contained within the level focus tube 220, and travels back toward the level PZT 215. In one embodiment not including the float 225, the level PZT 215 generates an acoustic wave signal, which propagates through the fluid, contained within the level focus tube 220, toward a surface 227 of the fluid. The acoustic wave signal reflects off of the surface 227 of the fluid and travels back toward the level PZT 215. The ToF of the acoustic wave signal is output to the control system 200.

The temperature sensor 175 determines a temperature of the fluid within the tank. In one embodiment the temperature sensor 175 is a thermocouple. In another embodiment, the temperature sensor 175 is a thermistor. In yet another embodiment, the temperature sensor 175 is a resistance temperature sensor. In yet another embodiment, the temperature sensor 175 is an infrared temperature sensor. The temperature sensor 175 outputs the sensed temperature to the control system 200. In some embodiments, the level sensor 170 and the temperature sensor 175 are combined into a combination sensor capable of sensing both a level and a temperature. In other embodiments, the level sensor 170, the temperature sensor 175, and the concentration sensor 165 are combined into a combination sensor capable of sensing all three metrics.

Figure 5:
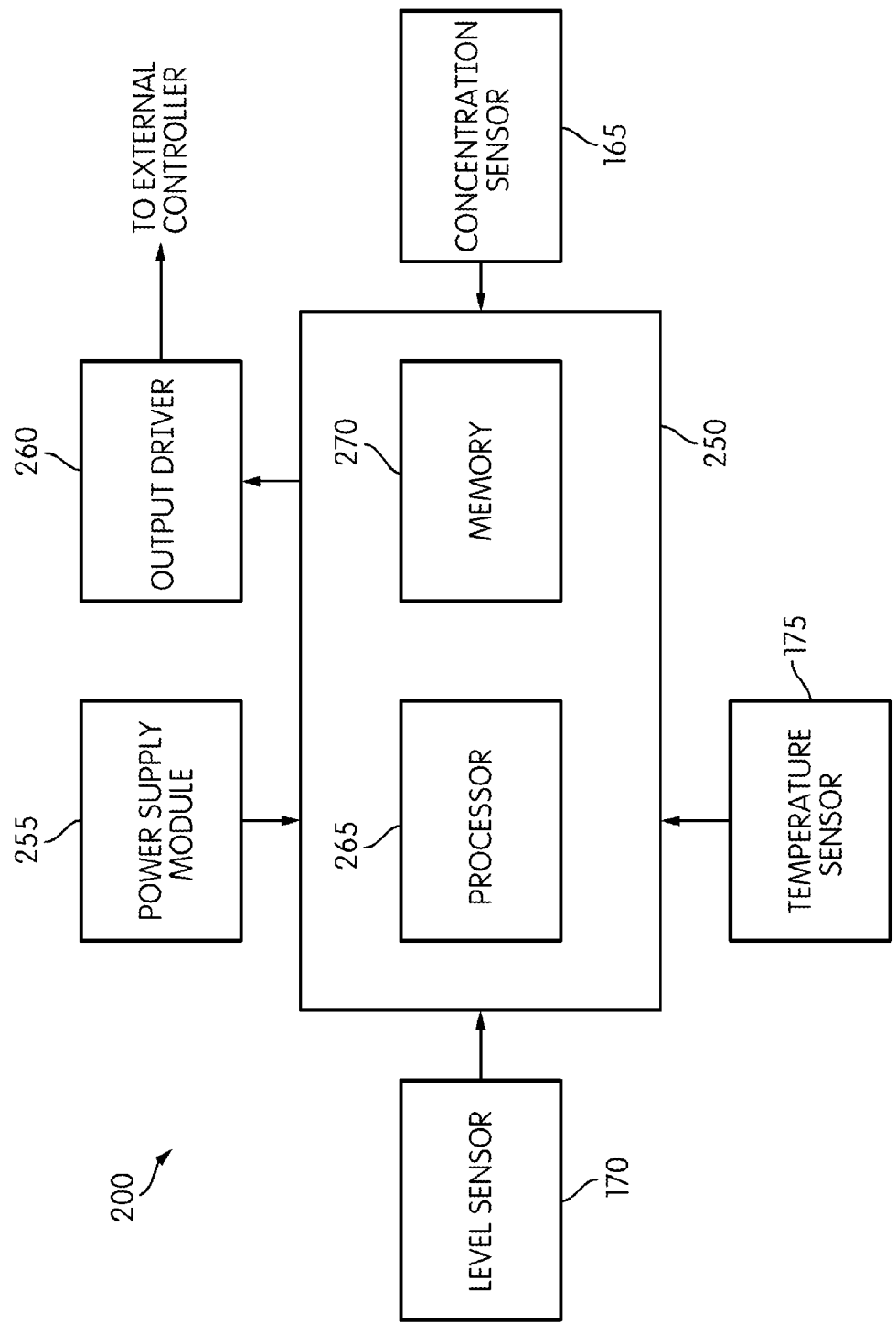
FIG. 5 is a block diagram illustrating a control system for the apparatus of FIGS. 2 and 3.

FIG. 5 shows a block diagram of the control system 200, which in some embodiments, is contained within the PCB 160 of the sensor system 125. In some embodiments, the control system 200 includes a plurality of electrical and electronic components that provide power, operation control, and protection to the components and modules within the control system 200 and/or the sensor system 125. For example, the control system 200 includes, among other things, a controller (such as a programmable microprocessor, microcontroller, or similar device) 250, a power supply module 255, and an output driver 260. The controller 250 includes, among other things, a processor 265 and a memory 270. The processor 265 is electrically connected to the memory 270, and executes software instructions which are capable of being stored on the memory 270. The controller 200 is configured to retrieve from memory and execute, among other things, instructions related to the control processes and method described herein. In other embodiments, the controller 200 includes additional, fewer, or different components.

The power supply module 255 supplies a nominal voltage to the control system 200 or other components of the sensor system 125. In one embodiment, the power supply module 225 supplies a nominal DC voltage. The power supply module 255 is powered by a power source having a nominal voltage and is configured to supply lower voltages to operate circuits and components within the control system 200 or sensor system 125.

The output driver 260 outputs data from the control system 260 to an external controller. The external controller, for example but not limited to, is a vehicle's data bus which controls the function of the vehicles DEF system. In some embodiments, the output driver 260 is in the form of a digital driver such as J1939 or CAN bus for communicating directly to the external controller. In other embodiments, the output driver 260 generates another suitable analog or digital signal, depending on the needs of the specific application. In some embodiments, the output driver 260 outputs a pulse-width modulated signal.

DEF used in an SCR system must be in liquid form. Therefore, the heater loop 110 maintains the DEF contained within the tank 90 at a temperature above the freezing point of DEF (approximately $-11°$ C.). In the illustrated embodiment, warm fluid (e.g., warm engine coolant) is directed through the tank 90 via the heater loop 110 in order to heat the DEF contained within the tank 90. In such an embodiment, the engine coolant is heated by the vehicle engine and the heated or warmed coolant is used to heat the DEF. Thus, certain embodiments use byproduct heat from the engine to heat the DEF. In this embodiment, warm engine coolant enters the tank 90 through the coolant input fitting 150, travels through the heater loop 110, and exits through the coolant output fitting 155. In another embodiment, the heater loop 110 is an electric heating element which converts electrical energy into heat through the use of a resistance coil.

When in liquid form, the DEF contained within the tank 90 is removed from the tank 90, for use with the SCR system, via the pickup line 115. The pickup line 115 includes a first end 300 and a second end 305. The first end 300 is attached to the pickup fitting 140 of the header 105. The second end 305 is located at the bottom of the tank 90. In some embodiments, a filter 310 is coupled to the second end 305. The filter 310 filters the fluid before it is removed from the tank 90. In operation, the fluid is filtered through the filter 310 before traveling up the pickup line 115. The filtered fluid then exits the tank 90 through the pickup fitting 140. The fluid (DEF) is then delivered to the SCR 60 via the DEF pickup pipe 80. The DEF is then used with the corresponding SCR 60.

Unused DEF is delivered to the tank 90 via the DEF return pipe 85. The unused DEF is returned inside the tank 90 via the return line 120. Unused DEF is warmed as a consequence of flowing past various components of the engine via the DEF return pipe 85 from the SCR 60. The DEF is warmed to a temperature high enough to defrost frozen DEF in the tank 90 and SCR system. The return line 120 includes a first end 315 and a second end 320. The first end 315 is attached to the return fitting 145 of the header 105. In order for the sensing system 125 to function properly, the DEF surrounding and within the sensing system 125 must be in liquid form. Thus, the second end 320 of the return line 120 is positioned in a manner that the warmed DEF is directed onto the sensor system 125.

As the warmed DEF is returned to the tank 90, the warmed DEF sprays onto the sensing system 125, thus defrosting any frozen DEF surrounding, or within, the sensing system 125. In some embodiments, the warmed DEF is sprayed at the top of the level focus tube 220. In such an embodiment, the warmed DEF runs down the level focus tube 220, thereby defrosting any frozen DEF within and around the level focus tube 220. The warmed DEF continues down the level focus tube 220 onto the other components of the sensing system 125, thus defrosting any frozen DEF surrounding, or within, the remaining components of the sensing system 125. The continual spraying of warmed DEF, via the return line 120, maintains the DEF sensed by the sensing system 125 in a liquid state.

Figure 6:
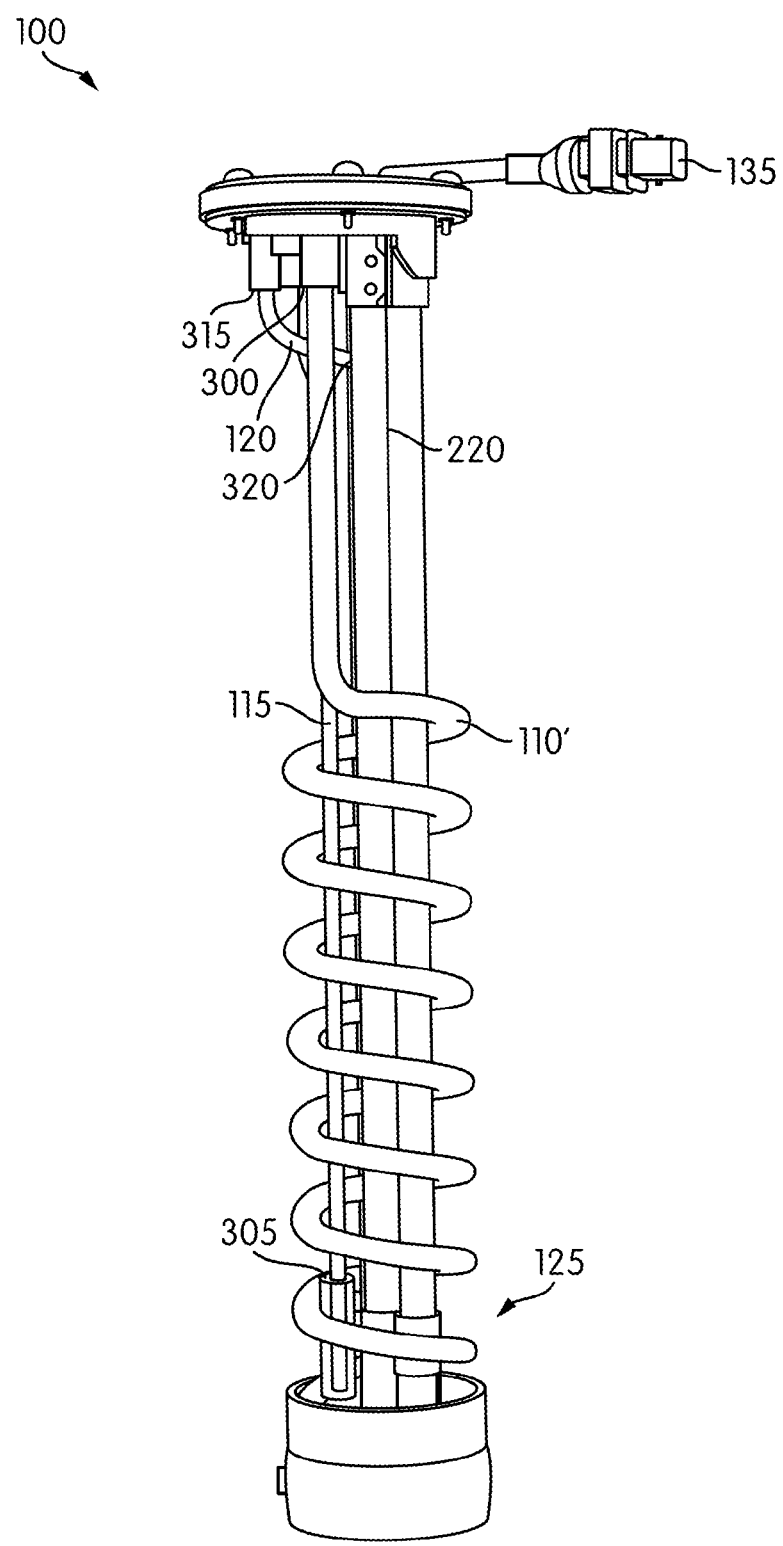
FIG. 6 is a side view of an apparatus for sensing a fluid for use in the system of FIG. 1, according to another embodiment of the invention.

In other embodiments the heater loop 110' has a loop-like configuration. FIG. 6 illustrates another embodiment of the apparatus 100. In such an embodiment, the heater loop 110' wraps around the pickup line 115 and the sensing system 125 in the form of a spring or corkscrew (i.e., the heater loop 110' has a spring-like, helix, or screw-like configuration). In such an embodiment, the return line 120 is directed onto the sensing system 125 and functions in a similar manner as discussed above in relation to the other embodiments.

In another embodiment of the apparatus 100, the heater loop 110 is looped into an oblong shape with straight vertical sides, in a form similar to that of a paperclip or paperclip-like. In such an embodiment, the heater loop 110 is located vertically adjacent to the pickup line 115 and the sensing system 125. In such an embodiment, the return line 120 is directed onto the sensing system 125 and functions in a similar manner as discussed above in relation to the other embodiments.

Thus, the invention provides, among other things, a system and method of heating a sensing module. Various features and advantages of the invention are set forth in the following claims.

What is claimed is:

1. A system for heating and sensing a fluid in a tank, the system comprising:
   a focus tube configured to contain at least a portion of the fluid;
   a sensing system including a sensor operable to sense a characteristic of the fluid, the sensing system coupled to the focus tube;
   a fluid pickup line configured to take in fluid from the tank and spaced apart from the sensor; and
   a fluid return line configured to return the fluid to the tank, the fluid return line including an output, the output positioned to direct fluid onto the focus tube such that the fluid runs down the focus tube onto the sensing system and at least partially defrosts fluid contained within the sensing system.

2. The system of claim 1, further comprising a pipe configured to provide the fluid to a system external to the tank, wherein the fluid is heated by heat generated by the external system.

3. The system of claim 1, wherein the sensor is at least one selected from the group consisting of a level sensor, a concentration sensor, and a temperature sensor.

4. The system of claim 1, wherein the sensor is a combination sensor configured to sense both a level and a temperature.

5. The system of claim 1, wherein the sensor is a combination sensor configured to sense a level, a temperature, and a concentration.

6. The system of claim 1, wherein the fluid returned to the tank is directed onto a top end of the focus tube.

7. The system as claimed in claim 1, further comprising a controller configured to receive the sensed characteristic of the fluid, analyze the sensed characteristic of the fluid, and output the analyzed characteristic of the fluid.

8. The system of claim 1, wherein the characteristic of the fluid is output to an external controller.

9. A method for defrosting components and sensing a fluid within a tank, the tank including a sensing system having a sensor and a controller, a fluid pickup line, a fluid return line, and a focus tube coupled to the sensing system, the method comprising:
   sensing a characteristic of the fluid;
   analyzing the sensed characteristic of the fluid;
   outputting the analyzed characteristic of the fluid;
   taking in fluid via the fluid pickup line and transporting the fluid outside the tank;
   returning the fluid to the tank via the fluid return line; and
   directing the returned fluid onto the focus tube such that the returned fluid runs down the focus tube and onto the sensing system.

10. The method of claim 9, further comprising
   directing the fluid to a system external to the tank,
   heating the fluid by heat generated by the external system, and
   directing the fluid onto the sensing system to at least partially defrost fluid contained within the sensing system.

11. The method of claim 9, wherein the sensed characteristic is at least one selected from the group consisting of a level, a concentration, and a temperature.

12. The system of claim 9, wherein the sensed characteristic includes a level and a temperature.

13. The system of claim 9, wherein the sensed characteristic includes a level, a temperature, and a concentration.

14. The method of claim 9, wherein the fluid returned to the tank is directed onto a top end of the focus tube.

15. The method of claim 9, wherein the analyzed characteristic of the fluid is output to an external controller.

16. The method of claim 9, wherein the fluid is a urea solution.

17. The method of claim 9, wherein the fluid is further heated by a heater loop.

18. The method of claim 17, wherein the heater loop directs a heated fluid through the tank.

19. The method of claim 17, wherein the heater loop has a configuration of at least one selected from the group consisting of loop-like, spring-like, and paperclip-like.

* * * * *